UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF TREATING BRINE.

1,386,244. Specification of Letters Patent. Patented Aug. 2, 1921.

No Drawing. Application filed September 26, 1918. Serial No. 255,813.

*To all whom it may concern:*

Be it known that I, HERBERT H. Dow, a citizen of the United States, and a resident of Midland, county of Midland, and State of Michigan, have invented a new and useful Improvement in Methods of Treating Brine, of which the following is a specification, the principle of the invention being herein explained and the best mode in which I have contemplated applying that principle, so as to distinguish it from other inventions.

The present improved method of treating brine has regard more particularly to the treatment of brines from the Midland field in Michigan which regularly contain calcium and magnesium chlorids in addition to sodium chlorid. Such brines also contain a very low percentage of bromids as well as iron, manganese, strontium and ammonia compounds, and sometimes other minor constituents. The present process is designed still more particularly to prepare a brine of the character described for electrolysis i. e. for use in electrolytic cells for the production of chlorin and caustic; in fact, the electrolysis may be regarded as one step or stage in the treatment which constitutes the general process. It is not intended, however, to limit the application of the process to this or any particular field of use or necessarily to use of a naturally occurring brine, since certain of the steps at least should be found capable of utilization in other connections. To the accomplishment of the foregoing and related ends the invention then consists of the steps hereinafter fully described and particularly pointed out in the claims, the following description setting forth in detail an approved mode of carrying out the invention, such disclosed mode, however, constituting but one of the various ways in which the principle of the invention may be used.

For the purpose of illustration, the process will be described as used in connection with the naturally occurring brine containing all of the constituents hereinbefore referred to. The first step, then, will consist in the elimination of the bromids, which is preferably accomplished by freeing the bromin, for example in the manner set forth in my Patent re No. 11,232 dated April 12, 1892, since this process simultaneously accomplishes the oxidation of the iron from its naturally occurring ferrous to the ferric condition.

The second step then consists in the precipitation of such ferric iron as well as of the manganese present by the addition of an alkali in a proper amount to react therewith. As the alkali for use in this precipitation I preferably use caustic soda solution derived from the subsequent electrolytic treatment of the brine and which I shall herein refer to as weak cell effluent. Such effluent will contain for example approximately 170 grams of sodium chlorid per liter and approximately 60 grams of caustic soda per liter, the exact percentage of the latter being unimportant although the amount present in any given quantity of the solution requires to be determined before the latter is used in the several steps of the process.

The precipitated iron and the manganese are now separated from the clear solution either by decantation or by filtration, and such solution is thereupon again treated with another measured quantity of such cell effluent i. e. with a quantity containing the proper amount of caustic soda to form a chemical equivalent for the magnesium chlorid contained in such brine. The result is the precipitation of the latter as magnesium hydrate, which is thereupon removed either by decantation or filtration, the product obtained being clean and white and free from all mineral or coloring matter, so as to be well adapted for the manufacture of magnesium oxid or fine chemicals. The residual solution thus freed from magnesium chlorid still contains calcium, strontium, and ammonium chlorids, in addition to the sodium chlorid, it being noted that by using the aforesaid cell effluent the caustic soda solution is already nearly saturated with sodium chlorid so that the residual solution is not materially diluted with water which would require to be later removed.

The next step is to again treat the residual solution with cell effluent whereby the brine is made appreciably alkaline and ammonia is liberated from the ammonium chlorid contained. If enough caustic soda is added, calcium hydrate will be precipitated but the latter is soluble in a calcium chlorid solution of the strength in hand so that the alkalinity can be relatively high before such precipitate remains. The alkalinity of magnesium hydrate is so slight that only a small percentage of the ammonia is set free in the process of precipitating such hydrate; however, as soon as the magnesium hydrate is precipitated, the odor of ammonia is markedly increased due to the freeing of the same from the magnesium chlorid as above described. Such ammonia is blown out with air or otherwise removed from the solution, leaving again a clear residual solution.

If not desired to recover the strontium separately, by treating such residual brine with carbonated cell effluent, the small amount of strontium may be precipitated along with the calcium in the form of carbonate. For the purpose in question the cell effluent is carbonated by being exposed to some form of carbon dioxid, for instance, stack gases, until the caustic soda therein is converted into carbonate of soda, it being desirable that the carbonation cease before bi-carbonate of soda is formed.

Where calcium hydrate is desired as distinguished from the carbonate, the brine following removal of the ammonia is treated with cell effluent until the calcium has all been precipitated in the form of the hydrate, whereupon it may be removed from the clear brine by decantation or filtration. The result is an unusually white and pure calcium hydrate that is especially desirable for use as pearl hardener, in the manufacture of bleach and for other purposes. Thus in the case of bleaching powder, even minute traces of iron produce decomposition if the product is to be shipped to or through tropical regions, so that a chemically pure product, such as I render possible, is of considerable commercial importance in this connection.

Following the elimination of the calcium in the form of hydrate, the strontium may be precipitated as carbonate, contaminated with a slight amount of calcium carbonate, by treating the residual solution with carbonated cell effluent in the same fashion as described above for precipitating the strontium and all the calcium together.

After the precipitation of these last named salts a substantially pure sodium chlorid brine remains, one that is ideally suited for electrolysis in electrolytic cells except that it is not quite saturated, lacking approximately 2 per cent. of such chlorid. Full saturation may, however, be readily secured either by directly adding the requisite amount of salt or by a very slight evaporation.

It will be apparent that by the above process a chemical equivalent of caustic soda is required for removing each of the various impurities in the salt brine. If, therefore, the total number of molecules of calcium, mangesium, strontium, ammonium and iron is equal to the number of molecules of sodium, then one-half the caustic produced in the plant would be required to precipitate the above mentioned so-called brine impurities. On the other hand, if only ten per cent. of the molecules in the brine were calcium, magnesium, strontium, etc., then only ten per cent. of the cells using the brine produced by this process would be required to make weak cell effluent for the treatment of the impurities, as above described. It is accordingly proposed with a brine of the character first described to operate approximately one-half of the electrolytic cells in the production of weak caustic solution such as hereinbefore referred to as cell effluent, while the other half of the cells will be operated, as is commonly the case, for the production of solid caustic soda, which is the commercial form.

It will further be understood that, in the manufacture of caustic soda with electrolytic cells, the efficiency of these cells tends to decrease when the diaphragms get old; however, if the strength of the caustic solution is reduced very materially, higher efficiency will again result. I therefore operate the newer and more efficient cells for the production of commercial caustic soda, and when these cells get old, I can still use them since the cell effluent or caustic of reduced strength therefrom can be utilized in the present process. By this means, cells may be maintained with a highly efficient production of caustic soda for a much greater length of time than would be possible if only commercial i. e. full-strength caustic were produced.

Aside from the advantages thus accruing in connection with the electrolysis of the brine, it will be noted that in effect no evaporation or heating of the brine is required to bring same to its full strength for use in the electrolytic cells, inasmuch as the brine has at no stage in its treatment been rendered more dilute, but, on the other hand, its salt content is increased. It is also to be noted that all of the constituents which may be regarded as impurities for the purpose of the electrolysis are separated from each other in a substantially pure form except that the strontium will be contaminated with a little calcium.

Other modes of applying the principle of my invention may be employed instead of the one explained, change being made as regards the method herein disclosed, provided the step or steps stated by any of the following claims or the equivalent of such step or steps be employed.

I therefore particularly point out and distinctly claim as my invention:—

1. In a method of treating a brine of the character described, the steps which consist in precipitating any iron and manganese therein; then precipitating magnesium; freeing any ammonia present; and finally precipitating any alkaline earth metal, so as to leave a pure solution of sodium chlorid, substantially as described.

2. In a method of treating a brine of the character described, the steps which consist in adding successive increments of the same reagent capable of precipitating in turn any iron or manganese in such brine, precipitating the magnesium, freeing any ammonia present, and finally precipitating any alkaline earth metal, substantially as described.

3. In a method of treating a brine of the character described, the steps which consist in adding successive increments of sodium hydroxid solution thereto so as to precipitate any iron or manganese in such brine, precipitate the magnesium, free any ammonia present, and finally precipitate any alkaline earth metal, substantially as described.

4. In a method of treating a brine of the character described, the steps which consist in adding successive increments of sodium hydroxid solution thereto so as to precipitate any iron or maganese in such brine, precipitate the magnesium, free any ammonia present, and finally precipitate any alkaline earth metal, substantially as described, the hydroxid solution being carbonated for use in such last step.

5. In a method of treating a brine for use in electrolytic cells for the production of caustic and chlorin, the steps which consist in adding successive increments of sodium hydroxid solution to such brine so as to precipitate any iron or manganese in such brine, precipitate the magnesium, free any ammonia present, and finally precipitate any alkaline earth metal, substantially as described; thereupon electrolyzing the resulting pure solution of sodium chlorid, and using the cathode effluent from the electrolytic cells for treating the brine as aforesaid.

6. In a method of treating a brine for use in electrolytic cells for the production of caustic and chlorin, the steps which consist in adding successive increments of sodium hydroxid solution to such brine so as to precipitate any iron or manganese in such brine, precipitate the magnesium, free any ammonia present, and finally precipitate any alkaline earth metal, substantially as described; thereupon electrolyzing the resulting pure solution of sodium chlorid, and using the cathode effluent from the electrolytic cells for treating the brine as aforesaid such effluent being carbonated for use in thus precipitating such alkaline earth metal.

7. In a method of treating a brine for use in electrolytic cells for the production of caustic and chlorin, the steps which consist in adding successive increments of sodium hydroxid solution to such brine so as to precipitate any iron or manganese in such brine, precipitate the magnesium, free any ammonia present, and finally precipitate any alkaline earth metal, substantially as described; thereupon electrolyzing the resulting pure solution of sodium chlorid, to produce a relatively weak cathode effluent; and using such relatively weak cathode effluent from the electrolytic cells for treating the brine as aforesaid.

8. In a method of treating a brine for use in electrolytic cells for the production of caustic and chlorin, the steps which consist in adding successive increments of sodium hydroxid to such brine so as to precipitate any iron or manganese in such brine, precipitate the magnesium, free any ammonia present, and finally precipitate any alkaline earth metal, substantially as described; thereupon electrolyzing the resulting pure solution of sodium chlorid in separate cells to produce a cathode effluent consisting of a relatively weak and strong solution of caustic soda, respectively and using such relatively weak solution for treating such brine as just described and such strong solution for commercial caustic.

9. In a method of treating a brine for use in electrolytic cells for the production of caustic and chlorin, the steps which consist in adding successive increments of sodium hydroxid to such brine, precipitate the magnesium, free any ammonia present, and finally precipitate any alkaline earth metal, substantially as described; thereupon electrolyzing the resulting pure solution of sodium chlorid in separate cells to produce a cathode effluent consisting of a relatively weak and strong solution of caustic soda, respectively and carbonating such relatively weak solution and using same in precipitating such alkaline earth metal.

10. In a method of treating a brine of the character described, the steps which consist in precipitating any iron and manganese therein; then precipitating magnesium; freeing any ammonia present; and finally precipitating separately any calcium and strontium, so as to leave a pure solution of sodium chlorid, substantially as described.

11. In a method of treating a brine of the character described, the steps which consist in adding successive increments of sodium hydroxid solution thereto so as to precipitate any iron or manganese in such brine, precipitate the magnesium, free any ammonia present, and finally precipitate separately any calcium and strontium, substantially as described.

12. In a method of treating a brine of the character described, the steps which consist in adding successive increments of sodium hydroxid solution thereto so as to precipitate any iron or manganese in such brine, precipitate the magnesium, free any ammonia present, and finally precipitate separately any calcium and strontium, substantially as described, the hydroxid being carbonated for use in precipitating such strontium.

13. The method of separating calcium and strontium from a brine containing the same in the form of chlorids in solution, which consists in adding successive increments of sodium hydroxid solution so as to precipitate such metals, respectively, the hydroxid solution being carbonated for use in precipitating the strontium.

Signed by me, this 20th day of September, 1918.

HERBERT H. DOW.